US012570076B2

(12) United States Patent
Sasada et al.

(10) Patent No.: US 12,570,076 B2
(45) Date of Patent: Mar. 10, 2026

(54) FILM AND LAMINATE

(71) Applicant: FUJIFILM Corporation, Tokyo (JP)

(72) Inventors: Yasuyuki Sasada, Kanagawa (JP); Miyoko Hara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/953,084

(22) Filed: Nov. 20, 2024

(65) Prior Publication Data

US 2025/0074039 A1 Mar. 6, 2025

Related U.S. Application Data

(63) Continuation of application No. PCT/JP2023/016331, filed on Apr. 25, 2023.

(30) Foreign Application Priority Data

May 31, 2022 (JP) ................................ 2022-089034

(51) Int. Cl.

| | |
|---|---|
| ***B32B 27/08*** | (2006.01) |
| ***B32B 7/022*** | (2019.01) |
| ***B32B 15/09*** | (2006.01) |
| ***B32B 27/36*** | (2006.01) |

(52) U.S. Cl.

CPC ............. *B32B 27/08* (2013.01); *B32B 7/022* (2019.01); *B32B 15/09* (2013.01); *B32B 27/36* (2013.01); *B32B 2270/00* (2013.01); *B32B 2307/204* (2013.01); *B32B 2307/54* (2013.01); *B32B 2307/7376* (2023.05)

(58) Field of Classification Search

CPC ........... B32B 27/08; B32B 7/022; B32B 5/09; B32B 27/36; B32B 2270/00; B32B 2307/204; B32B 2307/54; B32B 2307/7376

USPC .......................................................... 428/209

See application file for complete search history.

(56) References Cited

U.S. PATENT DOCUMENTS

| | | | | |
|---|---|---|---|---|
| 5,364,669 | A * | 11/1994 | Sumida | B32B 27/36 428/424.4 |
| 2010/0236820 | A1* | 9/2010 | Suh | B32B 5/024 428/141 |
| 2014/0023847 | A1 | 1/2014 | Kochiyama et al. | |
| 2014/0231123 | A1 | 8/2014 | Onodera et al. | |
| 2018/0242448 | A1 | 8/2018 | Yoshikawa et al. | |
| 2020/0198310 | A1* | 6/2020 | Kasai | C08J 5/18 |
| 2025/0074039 | A1* | 3/2025 | Sasada | B32B 15/09 |

FOREIGN PATENT DOCUMENTS

| | | |
|---|---|---|
| JP | 2003062942 | 3/2003 |
| JP | 2004050704 | 2/2004 |
| JP | 2019199612 | 11/2019 |
| JP | 2022190866 | 12/2022 |
| WO | 2012133594 | 10/2012 |
| WO | 2013065453 | 5/2013 |
| WO | 2016117243 | 7/2016 |

OTHER PUBLICATIONS

"International Search Report (Form PCT/ISA/210) of PCT/JP2023/016331," mailed on Aug. 8, 2023, with English translation thereof, pp. 1-7.

"Written Opinion of the International Searching Authority (Form PCT/ISA/237) of PCT/JP2023/016331," mailed on Aug. 8, 2023, with English translation thereof, pp. 1-12.

* cited by examiner

*Primary Examiner* — Betelhem Shewareged

(74) *Attorney, Agent, or Firm* — JCIPRNET

(57) ABSTRACT

Provided are a film having a plane A consisting of a composition A and a plane B consisting of a composition B as two imaginary planes perpendicular to a thickness direction, in which a content of at least one component A contained in the composition A is decreased from the plane A toward the plane B, a content of at least one component B contained in the composition B is decreased from the plane B toward the plane A, and a dielectric loss tangent is 0.010 or less, and an application thereof.

14 Claims, No Drawings

FILM AND LAMINATE

CROSS-REFERENCE TO RELATED APPLICATION

This application is a Continuation 1 of International Application No. PCT/JP2023/016331, filed Apr. 25, 2023, which claims priority to Japanese Patent Application No. 2022-089034 filed May 31, 2022. Each of the above applications is hereby expressly incorporated by reference, in its entirety, into the present application.

BACKGROUND OF THE INVENTION

1. Field of the Invention

The present disclosure relates to a film and a laminate.

2. Description of the Related Art

In recent years, frequencies used in communication equipment tend to be extremely high. In order to suppress transmission loss in a high frequency band, insulating materials used in a circuit board are required to have a lowered relative permittivity and a lowered dielectric loss tangent.

For example, JP2019-199612A discloses a resin composition including a styrene-based polymer, an inorganic filler, and a curing agent, in which the styrene-based polymer is an acid-modified styrene-based polymer having a carboxyl group, the inorganic filler is silica and/or aluminum hydroxide, a particle diameter of the inorganic filler is 1 μm or less, a content of the inorganic filler is 20 to 80 parts by mass with respect to 100 parts by mass of the styrene-based polymer, and the resin composition satisfies specific Expressions (A) and (B) in a form of a film having a thickness of 25 μm.

SUMMARY OF THE INVENTION

According to the embodiment of the present invention, a film having a low dielectric loss tangent and excellent laser processing suitability is provided.

In addition, according to another embodiment of the present invention, a laminate formed of the film is provided.

The present disclosure includes the following aspects.

<1> A film having a plane A consisting of a composition A and a plane B consisting of a composition B as two imaginary planes perpendicular to a thickness direction, in which a content of at least one component A contained in the composition A is decreased from the plane A toward the plane B, a content of at least one component B contained in the composition B is decreased from the plane B toward the plane A, and a dielectric loss tangent is 0.010 or less.

<2> The film according to <1>, including, in the thickness direction: a layer A consisting of the composition A and having the plane A; a layer B consisting of the composition B and having the plane B; and a mixed layer that is located between the layer A and the layer B and contains components included in the composition A and the composition B.

<3> The film according to <2>, in which an average thickness of the mixed layer is 1.0% or more with respect to a thickness of the film.

<4> The film according to <2> or <3>, in which an average thickness of at least one of the layer A or the layer B is 0.1 μm or more.

<5> The film according to any one of <2> to <4>, in which a value $L^A$ obtained by subtracting a weight residual rate of the layer A at 900° C. from a weight residual rate of the layer A at 440° C. is larger than a value $L^B$ obtained by subtracting a weight residual rate of the layer B at 900° C. from a weight residual rate of the layer B at 440° C.

<6> The film according to any one of <2> to <5>, in which a ratio of an elastic modulus of the layer A at 160° C. to an elastic modulus of the layer B at 160° C. is 1.2 or more.

<7> The film according to any one of <2> to <6>, in which an elastic modulus of the layer B at 160° C. is 100 MPa or less.

<8> The film according to any one of <2> to <7>, in which the layer B contains a thermoplastic resin containing a constitutional unit derived from a monomer having an aromatic hydrocarbon group.

<9> The film according to any one of <2> to <8>, in which the layer B contains a liquid crystal polymer.

<10> The film according to any one of <2> to <9>, in which the layer B contains an aromatic polyester amide.

<11> The film according to any one of <2> to <10>, in which the layer B contains crosslinked resin particles.

<12> The film according to any one of <2> to <11>, in which the layer A contains a liquid crystal polymer.

<13> The film according to any one of <2> to <12>, in which the layer A contains an aromatic polyester amide.

<14> A laminate comprising the film according to any one of <1> to <13>, and a metal layer or a metal wire, disposed on at least one surface of the film.

According to the embodiment of the present invention, a film having a low dielectric loss tangent and excellent laser processing suitability is provided.

In addition, according to another embodiment of the present invention, a laminate formed of the film is provided.

DESCRIPTION OF THE PREFERRED EMBODIMENTS

Hereinafter, the content of the present disclosure will be described in detail. The description of configuration requirements below is made based on representative embodiments of the present disclosure in some cases, but the present disclosure is not limited to such embodiments.

In the present disclosure, a numerical range expressed using "to" includes numerical values listed before and after "to" as the lower limit value and the upper limit value.

In a numerical range described in a stepwise manner in the present disclosure, an upper limit value or a lower limit value described in one numerical range may be replaced with an upper limit or a lower limit in another numerical range described in a stepwise manner. In addition, in a range of numerical values described in the present disclosure, the upper limit value or the lower limit value of the range of numerical values may be replaced with values illustrated in the examples.

In addition, in the present disclosure, in a case where there is no description regarding whether a group (atomic group) is substituted or unsubstituted, such a group includes both a group having no substituent and a group having a substituent. For example, the concept of an "alkyl group" includes not only an alkyl group that does not have a substituent (unsubstituted alkyl group) but also an alkyl group having a substituent (substituted alkyl group).

In the present disclosure, "(meth)acryl" is a term used to explain a concept including both the acryl and methacryl, and "(meth)acryloyl" is a term used to explain a concept including both the acryloyl and methacryloyl.

In addition, the term "step" in the present disclosure means not only an independent step but also a step that cannot be clearly differentiated from other steps as long as the intended goal of the step is achieved.

Further, in the present disclosure, "% by mass" has the same definition as that for "% by weight", and "part by mass" has the same definition as that for "part by weight".

Furthermore, in the present disclosure, a combination of two or more preferred embodiments is a more preferred embodiment.

In addition, the weight-average molecular weight (Mw) and the number-average molecular weight (Mn) in the present disclosure are molecular weights converted using polystyrene as a standard substance by performing detection with a gel permeation chromatography (GPC) analysis apparatus using TSKgel SuperHM-H (trade name, manufactured by Tosoh Corporation) column, a solvent of pentafluorophenol (PFP) and chloroform at a mass ratio of 1:2, and a differential refractometer, unless otherwise specified.

[Film]

The film according to the embodiment of the present disclosure, which is provided with a plane A consisting of a composition A and a plane B consisting of a composition B as two imaginary planes perpendicular to a thickness direction, in which a content of at least one component A contained in the composition A is decreased from the plane A toward the plane B, a content of at least one component B contained in the composition B is decreased from the plane B toward the plane A, and a dielectric loss tangent is 0.010 or less.

The present inventors have found that, in a film having two or more layers as described in JP2019-199612A, there is a problem in laser processing suitability. As a result of intensive studies, the present inventors have found that a film having excellent step followability can be provided by adopting the above configuration. The "laser processing suitability" in the present disclosure is a characteristic in that excessive cutting by a laser can be reduced in a case where cutting processing by a laser, particularly through-hole processing is performed, and it can be said that the "laser processing suitability" is excellent in a case where the above-described characteristic is excellent, and the workability of a cutting portion in laser processing into a desired shape is excellent.

In the film according to the embodiment of the present disclosure, it is considered that since the content of at least one component A contained in the composition A decreases from the plane A toward the plane B and the content of at least one component B contained in the composition B decreases from the plane B toward the plane A, the compositional change in the film is gentle, and the laser processing suitability is excellent.

<Overall Configuration>

The film according to the embodiment of the present disclosure has a plane A consisting of a composition A and a plane B consisting of a composition B as two imaginary planes perpendicular to a thickness direction. The "two imaginary planes perpendicular to a thickness direction" may be a surface (two main surfaces) of the film or may be a cross section obtained in a case where the film is cut in a direction perpendicular to the thickness direction. The composition of the components contained in the plane A and the plane B can be confirmed by ATR-IR (total reflection infrared spectroscopy) or TOF-SIMS (time-of-flight secondary ion mass spectrometry).

In the film according to the embodiment of the present disclosure, a content of at least one component A contained in the composition A is decreased from the plane A toward the plane B, and a content of at least one component B contained in the composition B is decreased from the plane B toward the plane A.

Both the direction from the plane A to the plane B and the direction from the plane B to the plane A are the thickness direction.

Examples of the aspect in which the content of at least one component A contained in the composition A is decreased from the plane A toward the plane B include an aspect in which the content of the component A is continuously decreased and an aspect in which the content of the component A is stepwisely decreased. Similarly, examples of the aspect in which the content of at least one component B contained in the composition B is decreased from the plane B toward the plane A include an aspect in which the content of the component B is continuously decreased and an aspect in which the content of the component B is stepwisely decreased.

Whether or not the content of at least one component A contained in the composition A is decreased from the plane A toward the plane B can be confirmed by the following method. In addition, whether or not the content of at least one component B contained in the composition B is decreased from the plane B toward the plane A can also be confirmed by the same method.

The composition is measured at an optional thickness from one main surface of the film. The measured compositions are compared with each other at each thickness to determine whether or not at least one component is decreased. The position and number of thicknesses at which the composition is measured are appropriately set according to the thickness of the film.

<Dielectric Loss Tangent>

From the viewpoint of reducing transmission loss, in the film according to the embodiment of the present disclosure, the dielectric loss tangent is 0.010 or less, preferably 0.005 or less, and more preferably greater than 0 and 0.002 or less.

In the present disclosure, the dielectric loss tangent is measured by the following method.

The dielectric loss tangent is measured by a resonance perturbation method at a frequency of 10 GHz. A 10 GHz cavity resonator (CP531 of Kanto Electronics Application & Development Inc.) is connected to a network analyzer ("E8363B" manufactured by Agilent Technology), and a measurement sample (width: 2.0 mm×length: 80 mm) is inserted into the cavity resonator, and the dielectric loss tangent of the measurement sample is measured based on a change in resonance frequency for 96 hours before and after the insertion in an environment of a temperature of 25° C. and a humidity of 60% RH.

A preferred aspect of the film according to the embodiment of the present disclosure is a film including, in a thickness direction: a layer A consisting of the composition A and having the plane A; a layer B consisting of the composition B and having the plane B; and a mixed layer that is located between the layer A and the layer B and contains components included in the composition A and the composition B.

Examples of a method for detecting or determining the layer configuration and the thickness of each layer in the film include the following methods.

First, a cross-sectional sample of the polymer film is cut out by a microtome, and a layer configuration and a thickness of each layer are determined with an optical microscope. In a case where the determination with an optical microscope is difficult, the determination may be obtained by performing morphological observation with a scanning electron microscope (SEM), component analysis with a time-of-flight secondary ion mass spectrometry (TOF-SIMS), or the like.

<Layer A>

The layer A consists of the composition A and includes a plane A. The layer A is a layer having a uniform composition of the composition A.

The components included in the composition A constituting the layer A are not particularly limited as long as the dielectric loss tangent of the film can be set to 0.010 or less. It is preferable that the layer A contains a polymer having a dielectric loss tangent of 0.010 or less.

In addition, the term "composition" generally means that a composition contains a plurality of components. However, in the present disclosure, the composition A may contain only one component or two or more components.

The type of the polymer having a dielectric loss tangent of 0.010 or less is not particularly limited, and a known polymer can be used.

Examples of the polymer contained in the first resin layer include thermoplastic resins such as a liquid crystal polymer, a fluororesin, a polymerized substance of a compound which has a cyclic aliphatic hydrocarbon group and a group having an ethylenically unsaturated bond, polyether ether ketone, polyolefin, polyamide, polyester, polyphenylene sulfide, polyether ketone, polycarbonate, polyethersulfone, polyphenylene ether and a modified product thereof, and polyetherimide; elastomers such as a copolymer of glycidyl methacrylate and polyethylene; and thermosetting resins such as a phenol resin, an epoxy resin, a polyimide, and a cyanate resin.

Among these, from the viewpoint of reducing the dielectric loss tangent of the film, the layer A preferably contains at least one polymer selected from the group consisting of a liquid crystal polymer, a fluororesin, a polymer of a compound having a cyclic aliphatic hydrocarbon group and a group having an ethylenically unsaturated bond, and a polyphenylene ether, more preferably contains at least one polymer selected from the group consisting of a liquid crystal polymer and a fluororesin, particularly preferably contains a liquid crystal polymer from the viewpoint of film forming properties and mechanical strength, and particularly preferably contains a fluororesin from the viewpoint of the dielectric loss tangent.

—Liquid Crystal Polymer—

The type of the liquid crystal polymer is not particularly limited, and a known liquid crystal polymer can be used.

In addition, the liquid crystal polymer may be a thermotropic liquid crystal polymer which exhibits liquid crystallinity in a molten state, or may be a lyotropic liquid crystal polymer which exhibits liquid crystallinity in a solution state. In addition, in a case of the thermotropic liquid crystal, it is preferable that the liquid crystal is melted at a temperature of 450° C. or lower.

Examples of the liquid crystal polymer include a liquid crystal polyester, a liquid crystal polyester amide in which an amide bond is introduced into the liquid crystal polyester, a liquid crystal polyester ether in which an ether bond is introduced into the liquid crystal polyester, and a liquid crystal polyester carbonate in which a carbonate bond is introduced into the liquid crystal polyester.

In addition, as the liquid crystal polymer, from the viewpoint of liquid crystallinity, a polymer having an aromatic ring is preferable, and an aromatic polyester or an aromatic polyester amide is more preferable.

Furthermore, the liquid crystal polymer may be a polymer in which an imide bond, a carbodiimide bond, a bond derived from an isocyanate, such as an isocyanurate bond, or the like is further introduced into the aromatic polyester or the aromatic polyester amide.

In addition, it is preferable that the liquid crystal polymer is a wholly aromatic liquid crystal polymer formed of only an aromatic compound as a raw material monomer.

Examples of the liquid crystal polymer include the following liquid crystal polymers.

1) a liquid crystal polymer obtained by polycondensing (i) an aromatic hydroxycarboxylic acid, (ii) an aromatic dicarboxylic acid, and (iii) at least one compound selected from the group consisting of an aromatic diol, an aromatic hydroxyamine, and an aromatic diamine;
2) a liquid crystal polymer obtained by polycondensing a plurality of types of aromatic hydroxycarboxylic acids;
3) a liquid crystal polymer obtained by polycondensing (i) an aromatic dicarboxylic acid and (ii) at least one compound selected from the group consisting of an aromatic diol, an aromatic hydroxyamine, and an aromatic diamine;
4) a liquid crystal polymer obtained by polycondensing (i) polyester such as polyethylene terephthalate and (ii) an aromatic hydroxycarboxylic acid.

Here, the aromatic hydroxycarboxylic acid, the aromatic dicarboxylic acid, the aromatic diol, the aromatic hydroxyamine, and the aromatic diamine may be each independently replaced with a polycondensable derivative.

For example, the aromatic hydroxycarboxylic acid and the aromatic dicarboxylic acid can be replaced with aromatic hydroxycarboxylic acid ester and aromatic dicarboxylic acid ester, by converting a carboxy group into an alkoxycarbonyl group or an aryloxycarbonyl group.

The aromatic hydroxycarboxylic acid and the aromatic dicarboxylic acid can be replaced with aromatic hydroxycarboxylic acid halide and aromatic dicarboxylic acid halide, by converting a carboxy group into a haloformyl group.

The aromatic hydroxycarboxylic acid and the aromatic dicarboxylic acid can be replaced with aromatic hydroxycarboxylic acid anhydride and aromatic dicarboxylic acid anhydride, by converting a carboxy group into an acyloxycarbonyl group.

Examples of a polymerizable derivative of a compound having a hydroxy group, such as an aromatic hydroxycarboxylic acid, an aromatic diol, and an aromatic hydroxyamine, include a derivative (acylated product) obtained by acylating a hydroxy group and converting the acylated group into an acyloxy group.

For example, the aromatic hydroxycarboxylic acid, the aromatic diol, and the aromatic hydroxyamine can be each replaced with an acylated product by acylating a hydroxy group and converting the acylated group into an acyloxy group.

Examples of a polymerizable derivative of a compound having an amino group, such as an aromatic hydroxyamine or an aromatic diamine, include a derivative (acylated product) obtained by acylating an amino group and converting the acylated group to an acylamino group.

For example, the aromatic hydroxyamine and the aromatic diamine can be each replaced with an acylated product by acylating an amino group and converting the acylated group into an acylamino group.

The liquid crystal polymer preferably has crystallinity (for example, aromatic polyester amide described later). In a case where the liquid crystal polymer has crystallinity, the dielectric loss tangent is further reduced.

A melting point of the liquid crystal polymer is preferably equal to or higher than 250° C., more preferably 250° C. to 350° C., and still more preferably 260° C. to 330° C.

The weight-average molecular weight of the liquid crystal polymer is preferably equal to or less than 1,000,000, more preferably 3,000 to 300,000, still more preferably 5,000 to 100,000, and particularly preferably 5,000 to 30,000.

The liquid crystal polymer preferably includes aromatic polyester amide from a viewpoint of further decreasing the dielectric loss tangent. Aromatic polyester amide is resin having at least one aromatic ring and having an ester bond and an amide bond. Aromatic polyester amide included in a resin layer is preferably fully aromatic polyester amide among the substances from a viewpoint of heat resistance.

Aromatic polyester amide preferably contains a constitutional unit represented by Formula 1, a constitutional unit represented by Formula 2, and a constitutional unit represented by Formula 3.

$$—O—Ar^1—CO \qquad \text{Formula 1}$$

$$—CO—Ar^2—CO \qquad \text{Formula 2}$$

$$—NH—Ar^3—O \qquad \text{Formula 3}$$

In Formula 1 to Formula 3, $Ar^1$, $Ar^2$, and $Ar^3$ each independently represent a phenylene group, a naphthylene group, or a biphenylylene group.

Hereinafter, the constitutional unit represented by Formula 1 and the like are also referred to as "unit 1" and the like.

The unit 1 can be introduced, for example, using aromatic hydroxycarboxylic acid as a raw material.

The unit 2 can be introduced, for example, using aromatic dicarboxylic acid as a raw material.

The unit 3 can be introduced, for example, using aromatic hydroxylamine as a raw material.

Here, the aromatic hydroxycarboxylic acid, the aromatic dicarboxylic acid, the aromatic diol, and the aromatic hydroxylamine may be each independently replaced with a polycondensable derivative.

For example, the aromatic hydroxycarboxylic acid and the aromatic dicarboxylic acid can be replaced with aromatic hydroxycarboxylic acid ester and aromatic dicarboxylic acid ester, by converting a carboxy group into an alkoxycarbonyl group or an aryloxycarbonyl group.

The aromatic hydroxycarboxylic acid and the aromatic dicarboxylic acid can be replaced with aromatic hydroxycarboxylic acid halide and aromatic dicarboxylic acid halide, by converting a carboxy group into a haloformyl group.

The aromatic hydroxycarboxylic acid and the aromatic dicarboxylic acid can be replaced with aromatic hydroxycarboxylic acid anhydride and aromatic dicarboxylic acid anhydride, by converting a carboxy group into an acyloxycarbonyl group.

Examples of a polymerizable derivative of a compound having a hydroxy group, such as an aromatic hydroxycarboxylic acid and an aromatic hydroxyamine, include a derivative (acylated product) obtained by acylating a hydroxy group and converting the acylated group into an acyloxy group.

For example, the aromatic hydroxycarboxylic acid and the aromatic hydroxylamine can be each replaced with an acylated product by acylating a hydroxy group and converting the acylated group into an acyloxy group.

Examples of a polycondensable derivative of the aromatic hydroxylamine include a substance (acylated product) obtained by acylating an amino group to convert the amino group into an acylamino group.

For example, the aromatic hydroxyamine can be replaced with an acylated product by acylating an amino group and converting the acylated group into an acylamino group.

In Formula 1, $Ar^1$ is preferably a p-phenylene group, a 2,6-naphthylene group, or a 4,4'-biphenylylene group, and more preferably a 2,6-naphthylene group.

In a case where $Ar^1$ is a p-phenylene group, the unit 1 is, for example, a constitutional unit derived from p-hydroxybenzoic acid.

In a case where $Ar^1$ is a 2,6-naphthylene group, the unit 1 is, for example, a constitutional unit derived from 6-hydroxy-2-naphthoic acid.

In a case where $Ar^1$ is a 4,4'-biphenylylene group, the unit 1 is, for example, a constitutional unit derived from 4'-hydroxy-4-biphenylcarboxylic acid.

In Formula 2, $Ar^2$ is preferably a p-phenylene group, an m-phenylene group, or a 2,6-naphthylene group, and more preferably an m-phenylene group.

In a case where $Ar^2$ is a p-phenylene group, the unit 2 is, for example, a constitutional unit derived from terephthalic acid.

In a case where $Ar^2$ is an m-phenylene group, the unit 2 is, for example, a constitutional unit derived from isophthalic acid.

In a case where $Ar^2$ is a 2,6-naphthylene group, the unit 2 is, for example, a constitutional unit derived from 2,6-naphthalenedicarboxylic acid.

In Formula 3, $Ar^3$ is preferably a p-phenylene group or a 4,4'-biphenylylene group, and more preferably a p-phenylene group.

In a case where $Ar^3$ is a p-phenylene group, the unit 3 is, for example, a constitutional unit derived from p-aminophenol.

In a case where $Ar^3$ is a 4,4'-biphenylylene group, the unit 3 is, for example, a constitutional unit derived from 4-amino-4'-hydroxybiphenyl.

With respect to the total content of the unit 1, the unit 2, and the unit 3, a content of the unit 1 is preferably 30 mol % or more, a content of the unit 2 is preferably 35% or less, and a content of the unit 3 is preferably 35 mol % or less.

The content of the unit 1 is preferably 30 mol % to 80 mol %, more preferably 30 mol % to 60 mol %, and particularly preferably 30 mol % to 40 mol % with respect to the total content of the unit 1, the unit 2, and the unit 3.

The content of the unit 2 is preferably 10 mol % to 35 mol %, more preferably 20 mol % to 35 mol %, and particularly preferably 30 mol % to 35 mol % with respect to the total content of the unit 1, the unit 2, and the unit 3.

The content of the unit 3 is preferably 10 mol % to 35 mol %, more preferably 20 mol % to 35 mol %, and particularly preferably 30 mol % to 35 mol % with respect to the total content of the unit 1, the unit 2, and the unit 3.

The total content of the constitutional units is a value obtained by totaling a substance amount (mol) of each constitutional unit. The substance amount of each constitutional unit is calculated by dividing a mass of each constitutional unit constituting aromatic polyester amide by a formula weight of each constitutional unit.

In a case where a ratio of the content of the unit 2 to the content of the unit 3 is expressed as [Content of unit 2]/[Content of unit 3] (mol/mol), the ratio is preferably 0.9/1 to 1/0.9, more preferably 0.95/1 to 1/0.95, and still more preferably 0.98/1 to 1/0.98.

Aromatic polyester amide may have two kinds or more of the unit 1 to the unit 3 each independently. Alternatively, aromatic polyester amide may have other constitutional units other than the unit 1 to the unit 3. A content of other constitutional units is preferably 10% by mole or less and more preferably 5% by mole or less with respect to the total content of all constitutional units.

Aromatic polyester amide is preferably produced by subjecting a source monomer corresponding to the constitutional unit constituting the aromatic polyester amide to melt polymerization.

The layer A may include only one or more kinds of aromatic polyester amides.

A content of aromatic polyester amide is preferably equal to or greater than 50% by mass, more preferably equal to or greater than 70% by mass, and still more preferably equal to or greater than 90% by mass, with respect to a total amount of the layer A. An upper limit value of the content of aromatic polyester amide is not particularly limited, and may be 100% by mass.

It is preferable that the liquid crystal polymer is produced by melt-polymerizing raw material monomers corresponding to the constitutional units constituting the liquid crystal polymer. The melt polymerization may be carried out in the presence of a catalyst, examples of the catalyst include metal compounds such as magnesium acetate, stannous acetate, tetrabutyl titanate, lead acetate, sodium acetate, potassium acetate, and antimony trioxide, and nitrogen-containing heterocyclic compounds such as 4-(dimethylamino)pyridine and 1-methylimidazole, and nitrogen-containing heterocyclic compounds are preferably used. The melt polymerization may be further carried out by solid phase polymerization as necessary.

A flow start temperature of the liquid crystal polymer is preferably 250° C. or higher, more preferably 250° C. or higher and 350° C. or lower, and still more preferably 260° C. or higher and 330° C. or lower. In a case where the flow start temperature of the liquid crystal polymer is within the above-described range, the solubility, the heat resistance, the strength, and the rigidity are excellent, and the viscosity of the solution is appropriate.

The flow start temperature, also referred to as a flow temperature, is a temperature at which a viscosity of 4,800 Pa·s (48,000 poises) is exhibited in a case where the liquid crystal polymer is melted and extruded from a nozzle having an inner diameter of 1 mm and a length of 10 mm while the temperature is raised at a rate of 4° C./min under a load of 9.8 MPa (100 kg/cm$^2$) using a capillary rheometer and is a guideline for the molecular weight of the liquid crystal polymer (see p. 95 of "Liquid Crystal Polymers-Synthesis/Molding/Applications-", written by Naoyuki Koide, CMC Corporation, Jun. 5, 1987).

—Fluororesin—

In the present disclosure, the type of the fluororesin is not particularly limited, and a known fluororesin can be used.

Examples of the fluororesin include a homopolymer and a copolymer containing a constitutional unit derived from a fluorinated α-olefin monomer, that is, an α-olefin monomer containing at least one fluorine atom. In addition, examples of the fluororesin include a copolymer containing a constitutional unit derived from a fluorinated α-olefin monomer, and a constitutional unit derived from a non-fluorinated ethylenically unsaturated monomer reactive to the fluorinated α-olefin monomer.

Examples of the fluorinated α-olefin monomer include $CF_2{=}CF_2$, $CHF{=}CF_2$, $CH_2{=}CF_2$, $CHCl{=}CHF$, $CClF{=}CF_2$, $CCl_2{=}CF_2$, $CClF{=}CClF$, $CHF{=}CCl_2$, $CH_2{=}CClF$, $CCl_2{=}CClF$, $CF_3CF{=}CF_2$, $CF_3CF{=}CHF$, $CF_3CH{=}CF_2$, $CF_3CH{=}CH_2$, $CHF_2CH{=}CHF$, $CF_3CF{=}CF_2$, and perfluoro (alkyl having 2 to 8 carbon atoms) vinyl ether (for example, perfluoromethyl vinyl ether, perfluoropropyl vinyl ether, and perfluorooctyl vinyl ether). Among these, as the fluorinated α-olefin monomer, at least one monomer selected from the group consisting of tetrafluoroethylene ($CF_2{=}CF_2$), chlorotrifluoroethylene ($CClF{=}CF_2$), (perfluorobutyl)ethylene, vinylidene fluoride ($CH_2{=}CF_2$), and hexafluoropropylene ($CF_2{=}CFCF_3$) is preferable.

Examples of the non-fluorinated ethylenically unsaturated monomer include ethylene, propylene, butene, and an ethylenically unsaturated aromatic monomer (for example, styrene and α-methylstyrene).

The fluorinated α-olefin monomer may be used alone or in combination of two or more thereof.

In addition, the non-fluorinated ethylenically unsaturated monomer may be used alone or in combination of two or more thereof.

Examples of the fluororesini include polychlorotrifluoroethylene (PCTFE), poly(chlorotrifluoroethylene-propylene), poly(ethylene-tetrafluoroethylene) (ETFE), poly(ethylene-chlorotrifluoroethylene) (ECTFE), poly(hexafluoropropylene), poly(tetrafluoroethylene-ethylene-propylene), poly(tetrafluoroethylene) (PTFE), poly(tetrafluoroethylene-hexafluoropropylene) (FEP), poly(tetrafluoroethylene-propylene) (FEPM), poly(tetrafluoroethylene-perfluoropropylene vinyl ether), poly(tetrafluoroethylene-perfluoroalkyl vinyl ether) (PFA) (for example, poly(tetrafluoroethylene-perfluoropropyl vinyl ether)), polyvinyl fluoride (PVF), polyvinylidene fluoride (PVDF), poly(vinylidene fluoride-chlorotrifluoroethylene), perfluoropolyether, perfluorosulfonic acid, and perfluoropolyoxetane.

The fluororesin may have a constitutional unit derived from fluorinated ethylene or fluorinated propylene.

The fluororesin may be used alone or in combination of two or more thereof.

The fluororesin is preferably FEP, PFA, ETFE, or PTFE.

The FEP is available from Du Pont as the trade name of TEFLON (registered trademark) FEP or from DAIKIN INDUSTRIES, LTD. as the trade name of NEOFLON FEP.

The PFA is available from DAIKIN INDUSTRIES, LTD. as the trade name of NEOFLON PFA, from Du Pont as the trade name of TEFLON (registered trademark) PFA, or from Solvay Solexis as the trade name of HYFLON PFA.

The fluororesin more preferably includes PTFE. The PTFE may be a PTFE homopolymer, a partially modified PTFE homopolymer, or a combination including one or both of these. The partially modified PTFE homopolymer preferably contains a constitutional unit derived from a comonomer other than tetrafluoroethylene in an amount of less than 1% by mass based on the total mass of the polymer.

The fluororesin may be a crosslinkable fluoropolymer having a crosslinkable group. The crosslinkable fluoropolymer can be crosslinked by a known crosslinking method in the related art. One of the representative crosslinkable fluoropolymers is a fluoropolymer having (meth)acryloyloxy. For example, the crosslinkable fluoropolymer can be represented by Formula: $H_2C{=}CR'COO{-}(CH_2)_n{-}R{-}(CH_2)_n{-}OOCR'{=}CH_2$.

In the formula, R is an oligomer chain having a constitutional unit derived from the fluorinated α-olefin monomer, R' is H or —$CH_3$, and n is 1 to 4. R may be a fluorine-based oligomer chain having a constitutional unit derived from tetrafluoroethylene.

In order to initiate a radical crosslinking reaction through the (meth)acryloyloxy group in the fluororesin, by exposing the fluoropolymer having a (meth)acryloyloxy group to a free radical source, a crosslinked fluoropolymer network can be formed. The free radical source is not particularly limited, and suitable examples thereof include a photoradical polymerization initiator and an organic peroxide. Appropriate photoradical polymerization initiators and organic peroxides are well known in the art. The crosslinkable fluoropolymer is commercially available, and examples thereof include Viton B manufactured by Du Pont.

—Polymerized Substance of Compound which has Cyclic Aliphatic Hydrocarbon Group and Group Having Ethylenically Unsaturated Bond—

Examples of the polymerized substance of a compound which has a cyclic aliphatic hydrocarbon group and a group having an ethylenically unsaturated bond include thermoplastic resins having a constitutional unit derived from a cyclic olefin monomer such as norbornene and a polycyclic norbornene-based monomer.

The polymerized substance of a compound which has a cyclic aliphatic hydrocarbon group and a group having an ethylenically unsaturated bond may be a ring-opened polymer of the above-described cyclic olefin, a hydrogenated product of a ring-opened copolymer using two or more cyclic olefins, or an addition polymer of a cyclic olefin and a linear olefin or aromatic compound having an ethylenically unsaturated bond such as a vinyl group. In addition, a polar group may be introduced into the polymerized substance of a compound which has a cyclic aliphatic hydrocarbon group and a group having an ethylenically unsaturated bond.

The polymerized substance of a compound which has a cyclic aliphatic hydrocarbon group and a group having an ethylenically unsaturated bond may be used alone or in combination of two or more thereof.

A ring structure of the cyclic aliphatic hydrocarbon group may be a single ring, a fused ring in which two or more rings are fused, or a crosslinked ring.

Examples of the ring structure of the cyclic aliphatic hydrocarbon group include a cyclopentane ring, a cyclohexane ring, a cyclooctane ring, an isophorone ring, a norbornane ring, and a dicyclopentane ring.

The compound which has a cyclic aliphatic hydrocarbon group and a group having an ethylenically unsaturated bond is not particularly limited, and examples thereof include a (meth)acrylate compound having a cyclic aliphatic hydrocarbon group, a (meth)acrylamide compound having a cyclic aliphatic hydrocarbon group, and a vinyl compound having a cyclic aliphatic hydrocarbon group. Among these, preferred examples thereof include a (meth)acrylate compound having a cyclic aliphatic hydrocarbon group. In addition, the compound which has a cyclic aliphatic hydrocarbon group and a group having an ethylenically unsaturated bond may be a monofunctional ethylenically unsaturated compound or a polyfunctional ethylenically unsaturated compound.

The number of cyclic aliphatic hydrocarbon groups in the compound which has a cyclic aliphatic hydrocarbon group and a group having an ethylenically unsaturated bond may be 1 or more, and may be 2 or more.

It is sufficient that the polymerized substance of a compound which has a cyclic aliphatic hydrocarbon group and a group having an ethylenically unsaturated bond is a polymer obtained by polymerizing at least one compound which has a cyclic aliphatic hydrocarbon group and a group having an ethylenically unsaturated bond, and it may be a polymerized substance of two or more kinds of the compound which has a cyclic aliphatic hydrocarbon group and a group having an ethylenically unsaturated bond or a copolymer with other ethylenically unsaturated compounds having no cyclic aliphatic hydrocarbon group.

In addition, the polymerized substance of a compound which has a cyclic aliphatic hydrocarbon group and a group having an ethylenically unsaturated bond is preferably a cycloolefin polymer.

—Polyphenylene Ether—

In the polyphenylene ether, from the viewpoint of dielectric loss tangent and heat resistance, the average number of molecular terminal phenolic hydroxyl groups per molecule (the number of terminal hydroxyl groups) is preferably 1 to 5 and more preferably 1.5 to 3.

The number of terminal hydroxyl groups in the polyphenylene ether can be found, for example, from a standard value of a product of the polyphenylene ether. In addition, the number of terminal hydroxyl groups is expressed as, for example, an average value of the number of phenolic hydroxyl groups per molecule of all polyphenylene ethers present in 1 mol of the polyphenylene ether.

The polyphenylene ether may be used alone or in combination of two or more thereof.

Examples of the polyphenylene ether include a polyphenylene ether including 2,6-dimethylphenol and at least one of bifunctional phenol or trifunctional phenol, and poly(2,6-dimethyl-1,4-phenylene oxide). More specifically, the polyphenylene ether is preferably a compound having a structure represented by Formula (PPE).

(PPE)

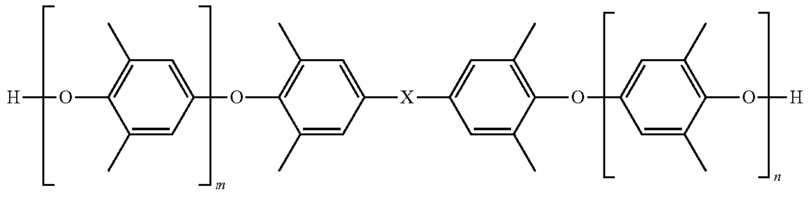

In Formula (PPE), X represents an alkylene group having 1 to 3 carbon atoms or a single bond, m represents an integer of 0 to 20, n represents an integer of 0 to 20, and the sum of m and n represents an integer of 1 to 30.

Examples of the alkylene group in X described above include a dimethylmethylene group.

In a case where heat curing is performed after film formation, from the viewpoint of heat resistance and film-forming property, a weight-average molecular weight (Mw) of the polyphenylene ether is preferably 500 to 5,000 and more preferably 500 to 3,000. In addition, in a case where the heat curing is not performed, the weight-average molecular weight (Mw) of the polyphenylene ether is not particularly limited, but is preferably 3,000 to 100,000 and more preferably 5,000 to 50,000.

—Aromatic Polyether Ketone—

The aromatic polyether ketone is not particularly limited, and a known aromatic polyether ketone can be used.

The aromatic polyether ketone is preferably a polyether ether ketone.

The polyether ether ketone is one type of the aromatic polyether ketone, and is a polymer in which bonds are arranged in the order of an ether bond, an ether bond, and a carbonyl bond. It is preferable that the bonds are linked to each other by a divalent aromatic group.

The aromatic polyether ketone may be used alone or in combination of two or more thereof.

Examples of the aromatic polyether ketone include polyether ether ketone (PEEK) having a chemical structure represented by Formula (P1), polyether ketone (PEK) having a chemical structure represented by Formula (P2), polyether ketone ketone (PEKK) having a chemical structure represented by Formula (P3), polyether ether ketone ketone (PEEKK) having a chemical structure represented by Formula (P4), and polyether ketone ether ketone ketone (PEKEKK) having a chemical structure represented by Formula (P5).

(P1)

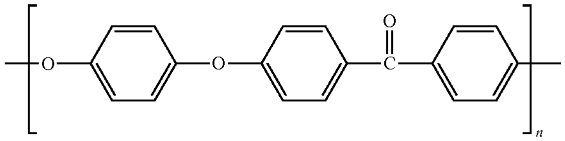

(P2)

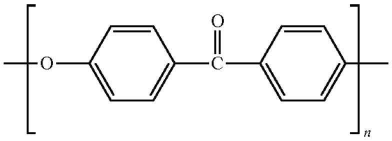

(P3)

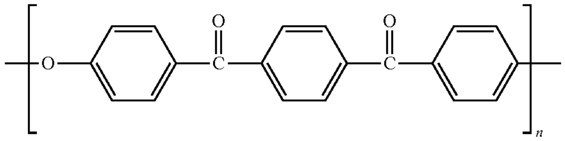

(P4)

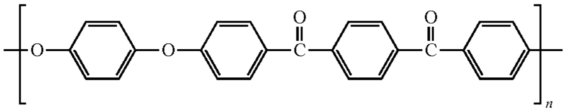

(P5)

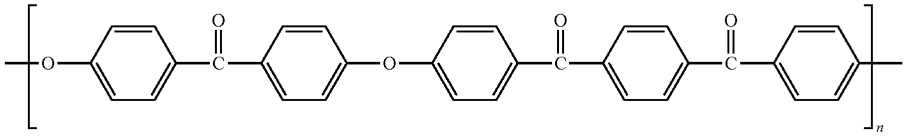

From the viewpoint of mechanical properties, each n of Formulae (P1) to (P5) is preferably 10 or more and more preferably 20 or more. On the other hand, from the viewpoint that the aromatic polyether ketone can be easily produced, n is preferably 5,000 or less and more preferably 1,000 or less. That is, n is preferably 10 to 5,000 and more preferably 20 to 1,000.

As described above, the layer A preferably contains a polymer having a dielectric loss tangent of 0.010 or less.

In a case where the layer A contains a polymer having a dielectric loss tangent of 0.010 or less, from the viewpoint of the dielectric loss tangent of the film and the adhesiveness to the metal layer, the content of the polymer having a dielectric loss tangent of 0.010 or less is preferably 10% by mass to 90% by mass, more preferably 15% by mass to 85% by mass, still more preferably 15% by mass to 80% by mass, and particularly preferably 15% by mass to 50% by mass with respect to the total mass of the layer A.

—Filler—

The layer A may contain at least one filler from the viewpoint of the thermal expansion coefficient and the adhesiveness to the metal layer.

The filler may be particulate or fibrous. The filler may be an inorganic filler or an organic filler. From the viewpoint of the dielectric loss tangent and the step followability of the film, the filler is preferably an organic filler.

As the organic filler, a known organic filler can be used.

Examples of a material of the organic filler include polyethylene, polystyrene, urea-formalin filler, polyester, cellulose, acrylic resin, fluororesin, cured epoxy resin, crosslinked benzoguanamine resin, crosslinked acrylic resin, a liquid crystal polymer, and a material containing two or more kinds of these.

In addition, the organic filler may be fibrous, such as nanofibers, or may be hollow resin particles.

Among these, from the viewpoint of the dielectric loss tangent of the film and the level difference followability, the organic filler is particularly preferably fluororesin particles, polyester-based resin particles, polyethylene particles, liquid crystal polymer particles, or cellulose-based resin nanofibers are preferable, polytetrafluoroethylene particles, polyethylene particles, or liquid crystal polymer particles are more preferable, and liquid crystal polymer particles. Here, the liquid crystal polymer particles are not limited, but refer to particles obtained by polymerizing a liquid crystal polymer and crushing the liquid crystal polymer with a crusher or the like to obtain powdery liquid crystal. The liquid crystal polymer particles are preferably smaller than the thickness of each layer.

From the viewpoints of the dielectric loss tangent of the film, the laser processing suitability, and the level difference followability, the average particle diameter of the organic filler is preferably 5 nm to 20 μm and more preferably 100 nm to 10 μm.

As the inorganic filler, a known inorganic filler can be used.

Examples of a material of the inorganic filler include BN, $Al_2O_3$, AlN, $TiO_2$, $SiO_2$, barium titanate, strontium titanate, aluminum hydroxide, calcium carbonate, and a material containing two or more of these.

Among these, from the viewpoint of thermal expansion coefficient and adhesiveness with the metal layer, the inorganic filler is preferably metal oxide particles or fibers, more preferably silica particles, titania particles, or glass fibers, and is particularly preferably silica particles or glass fibers.

An average particle diameter of the inorganic filler is preferably approximately 20% to approximately 40% of the thickness of a layer A, and for example, the average particle diameter may be selected from 25%, 30%, or 35% of the thickness of the layer A. In a case where the particles or fibers are flat, the average particle diameter indicates a length in a short side direction.

In addition, from the viewpoint of thermal expansion coefficient and adhesiveness with the metal layer, the average particle diameter of the inorganic filler is preferably 5 nm to 20 μm, more preferably 10 nm to 10 μm, still more preferably 20 nm to 1 μm, and particularly preferably 25 nm to 500 nm.

—Other Additives—

The layer A may contain an additive other than the above-described components.

Known additives can be used as other additives. Specific examples of the other additives include a curing agent, a leveling agent, an antifoaming agent, an antioxidant, an ultraviolet absorbing agent, a flame retardant, and a colorant.

<Layer B>

The layer B consists of the composition B and includes a plane B. The layer B is a layer having a uniform composition of the composition B.

The components contained in the composition B constituting the layer B are not particularly limited as long as the dielectric loss tangent of the film can be set to 0.010 or less. The layer B preferably contains at least one polymer.

From the viewpoints of the dielectric loss tangent of the film, the laser processing suitability, and the step followability, the layer B preferably contains a thermoplastic resin. The thermoplastic resin may be a thermoplastic elastomer. The elastomer refers to a polymer compound exhibiting elastic deformation. That is, the elastomer corresponds to a polymer compound having a property of being deformed according to an external force in a case where the external force is applied and of being recovered to an original shape in a short time in a case where the external force is removed.

Examples of the thermoplastic resin include a polyurethane resin, a polyester resin, a (meth)acrylic resin, a polystyrene resin, a fluororesin, a polyimide resin, a fluorinated polyimide resin, a polyamide resin, a polyamideimide resin, a polyether imide resin, a cellulose acylate resin, a polyurethane resin, a polyether ether ketone resin, a polycarbonate resin, a polyolefin resin (for example, a polyethylene resin, a polypropylene resin, a resin consisting of a cyclic olefin copolymer, and an alicyclic polyolefin resin), a polyarylate resin, a polyether sulfone resin, a polysulfone resin, a fluorene ring-modified polycarbonate resin, an alicyclic ring-modified polycarbonate resin, and a fluorene ring-modified polyester resin.

The thermoplastic elastomer is not particularly limited, and examples thereof include an elastomer including a constitutional repeating unit derived from styrene (polystyrene-based elastomer), a polyester-based elastomer, a polyolefin-based elastomer, a polyurethane-based elastomer, a polyamide-based elastomer, a polyacryl-based elastomer, a silicone-based elastomer, and a polyimide-based elastomer. The thermoplastic elastomer may be a hydride.

Examples the polystyrene-based elastomer include a styrene-butadiene-styrene block copolymer (SBS), a styrene-isoprene-styrene block copolymer (SIS), a polystyrene-poly(ethylene-propylene) diblock copolymer (SEP), a polystyrene-poly(ethylene-propylene)-polystyrene triblock copolymer (SEPS), a styrene-ethylene-butylene-styrene block copolymer (SEBS), a polystyrene-poly(ethylene/ethylene-propylene)-polystyrene triblock copolymer (SEEPS), and hydrides thereof.

Among these, from the viewpoint of the dielectric loss tangent of the film, the laser processing suitability, and the level difference followability, the layer B preferably contains, a thermoplastic resin having a constitutional unit derived from a monomer having an aromatic hydrocarbon group, more preferably contains a polystyrene-based elastomer, and particularly preferably contains a hydrogenated styrene-ethylene-butylene-styrene block copolymer.

In addition, the layer B preferably contains a hydrogenated polystyrene-based elastomer from the viewpoints of the dielectric loss tangent of the film, the laser processing suitability, and the step followability.

The content of the thermoplastic resin is not particularly limited, but from the viewpoints of the dielectric loss tangent of the film, the laser processing suitability, and the adhesiveness to the metal layer, the content is preferably 50% by mass to 100% by mass and more preferably 60% by mass to 90% by mass with respect to the total mass of the layer B.

In addition, from the viewpoint of the dielectric loss tangent of the film, the layer B preferably contains a polymer having a dielectric loss tangent of 0.010 or less. The preferred aspect of the polymer having a dielectric loss tangent of 0.010 or less is the same as the preferred aspect of the polymer having a dielectric loss tangent of 0.010 or less, which can be contained in the layer A.

Among these, the layer B preferably contains a liquid crystal polymer and more preferably contains aromatic polyester amide.

In a case where the layer B contains a polymer having a dielectric loss tangent of 0.010 or less, the content of the polymer having a dielectric loss tangent of 0.010 or less is not particularly limited, but from the viewpoints of the dielectric loss tangent of the film, the laser processing suitability, and the adhesiveness to the metal layer, the content is preferably 10% by mass to 100% by mass, more preferably 10% by mass to 70% by mass, and particularly preferably 10% by mass to 60% by mass with respect to the total mass of the layer B.

From the viewpoints of the dielectric loss tangent of the film, laser processing suitability, adhesiveness to a metal layer, and level difference followability, it is more preferable that the layer B includes a filler.

The preferred aspect of the filler used in the layer B is the same as the preferred aspect of the filler which can be contained in the layer A, except as described later.

In addition, as the filler used in the layer B, the particles of the above-described thermoplastic resin are also preferably mentioned.

Further, from the viewpoints of the dielectric loss tangent of the film, the laser processing suitability, and the level difference followability, at least one of the polymer or the filler contained in the layer B is preferably a polymer having a dielectric loss tangent of 0.01 or less, and more preferably a liquid crystal polymer.

In addition, from the viewpoints of the dielectric loss tangent of the film, the laser processing suitability, and the level difference followability, the layer B preferably contains crosslinked resin particles as the filler.

The crosslinked resin in the crosslinked resin particles is not particularly limited, and a known crosslinked resin can be used. For example, the crosslinked resin may be a crosslinked resin obtained by using a crosslinking agent during polymerization or a crosslinked resin obtained by reacting a crosslinking agent with a resin.

Among these, as the crosslinked resin particles, from the viewpoints of the dielectric loss tangent of the film, the laser processing suitability, and the level difference followability, the thermoplastic elastomer particles are preferable, polystyrene-based elastomer particles are more preferable, and hydrogenated polystyrene-based elastomer is particularly preferable.

The layer B may contain only one or two or more kinds of the fillers.

In addition, from the viewpoint of laser processing suitability and adhesiveness to the metal layer, the content of the filler in the layer B is preferably 10% by mass to 90% by mass and more preferably 20% by mass to 80% by mass with respect to the total mass of the layer B. The layer B may contain an additive other than those described above.

Preferred aspects of other additives which are used in the layer B are the same as the preferred aspects of other additives which are used in the layer A, except as described below.

The layer B is preferably a surface layer (outermost layer). In a case where the film is used as, for example, a laminate (a laminated plate with a metal layer) having a layer configuration of a metal layer/film, another metal layer or a laminated plate with a metal layer may be further disposed on the layer B side. In this case, interface destruction between the layer B and another metal layer in the laminate is suppressed, and the adhesiveness with the metal layer is improved.

—Relationship Between Layer a and Layer B—

(Average Thickness)

The average thickness of at least one of the layer A or the layer B is preferably 0.1 μm or more.

From the viewpoints of the dielectric loss tangent of the film and the adhesiveness to the metal, the average thickness of the layer A is preferably thicker than the average thickness of the layer B.

From the viewpoint of dielectric loss tangent of the film and adhesiveness to the metal, a value of $T^A/T^B$, which is a ratio of the average thickness $T^A$ of the layer A to the average thickness $T^B$ of the layer B, is preferably 0.8 to 10, more preferably 1 to 5, still more preferably more than 1 and 3 or less, and particularly preferably more than 1 and 2 or less.

The average thickness of the layer A is not particularly limited, but from the viewpoint of the dielectric loss tangent of the film and the adhesiveness to the metal layer, is preferably 0.1 μm or more, more preferably 5 μm to 90 μm, still more preferably 10 μm to 70 μm, and particularly preferably 15 μm to 60 μm.

The average thickness of the layer B is not particularly limited, but from the viewpoints of the dielectric loss tangent of the film, the laser processing suitability, and the step followability, is preferably 0.1 μm or more, more preferably 1 μm to 90 μm, still more preferably 5 μm to 60 μm, and particularly preferably 10 μm to 40 μm.

A method of measuring the average thickness of each layer in the film according to the embodiment of the present disclosure is as follows.

The thickness of each layer is evaluated by cutting the film with a microtome and observing the cross section with an optical microscope. Three or more sites of the cross-sectional sample are cut out, the thickness is measured at three or more points in each cross section, and the average value thereof is defined as the average thickness.

(Weight Residual Rate)

From the viewpoints of the dielectric loss tangent, the laser processing suitability, and the level difference followability of the film, it is preferable that a value $L^A$ obtained by subtracting a weight residual rate of the layer A at 900° C. from a weight residual rate of the layer A at 440° C. is larger than a value $L^B$ obtained by subtracting a weight residual rate of the layer B at 900° C. from a weight residual rate of the layer B at 440° C. In the present disclosure, the value obtained by subtracting $L^B$ from $L^A$ ($L^A$-$L^B$) is not particularly limited, but from the viewpoint of laser processing suitability and step followability, is preferably less than 100%, more preferably 95% or less, still more preferably 10% to 90%, and particularly preferably 10% to 85%.

From the viewpoints of the dielectric loss tangent of the film, the laser processing suitability, and the followability of a step, $L^A$ is preferably 80% or more, more preferably 85% or more, and particularly preferably 90% to 100%.

From the viewpoints of the dielectric loss tangent of the film, the laser processing suitability, and the step followability, $L^B$ is preferably 5% or more, more preferably 8% to 80%, and particularly preferably 10% to 60%.

The method of measuring a value obtained by subtracting the weight residual rate of the layer A or the layer B at 900° C. from the weight residual rate of the layer A or the layer B at 440° C. in the present disclosure is as follows.

The layer A or the layer B is cut from the film, 5 mg thereof is added to a platinum pan, and the measurement is performed at a temperature rising rate of 10° C./min and a measurement temperature of 25° C. to 900° C. using a differential thermal balance (TG-DTA) (TG-8120 manufactured by Rigaku Corporation).

$$\text{Weight residual rate}\left(\%, L^A \text{ or } L^B\right) = \text{weight residual rate}\,(\%)\text{ at }440°\,C.-\text{weight residual rate}\,(\%)\text{ at }900°\,C.$$

(Elastic Modulus)

From the viewpoints of the dielectric loss tangent of the film, the laser processing suitability, and the followability of a step, it is preferable that the elastic modulus of the layer A at 160° C. is larger than the elastic modulus of the layer B at 160° C. in the film according to the embodiment of the present disclosure.

From the viewpoint of laser processing suitability and step followability, a ratio of the elastic modulus of the layer A at 160° C. to the clastic modulus of the layer B at 160° C. is preferably 1.2 or more, more preferably 5 to 1,000, and still more preferably 100 to 500.

From the viewpoints of laser processing suitability and step followability, the elastic modulus of the layer A at 160° C. is preferably 100 MPa to 2,500 MPa, more preferably 200 MPa to 2,000 MPa, still more preferably 300 MPa to 1,500 MPa, and particularly preferably 500 MPa to 1,000 MPa.

From the viewpoints of laser processing suitability and step followability, the elastic modulus of the layer B at 160° C. is preferably 100 MPa or less, more preferably 10 MPa or less, still more preferably 0.001 MPa to 10 MPa, and particularly preferably 0.5 MPa to 5 MPa. In the present disclosure, the elastic modulus is measured by the following method.

First, the film was cut in cross section with a microtome or the like, and the layer A or the layer B is specified with an optical microscope. Next, the elastic modulus of the specified layer A or layer B is measured as an indentation elastic modulus using a nanoindentation method. The indentation elastic modulus is measured by using a microhardness tester (product name "DUH-W201", manufactured by Shimadzu Corporation) to apply a load at a loading rate of 0.28 mN/sec with a Vickers indenter at 160° C., holding a maximum load of 10 mN for 10 seconds, and then unloading at a loading rate of 0.28 mN/sec.

<Mixed Layer>

The mixed layer preferably contains the components contained in the composition A and the composition B. The mixed layer preferably contains at least one of the components contained in the composition A and at least one of the components contained in the composition B. In a case where a mixed layer containing components contained in the composition A and the composition B is present on the film, the compositional change is more gentle in the thickness direction of the film, and the laser processing suitability is improved.

The mixed layer may contain the components contained in the composition A and the composition B, and may be a layer having a uniform composition or a layer having an uneven composition.

Whether or not the mixed layer is present on the film can be confirmed by the following method.

The composition is measured at an optional thickness from one main surface of the film. Based on the measured composition, it is determined whether or not there is a composition containing the components contained in the layer A and the layer B, at each thickness. The position and number of thicknesses at which the composition is measured are appropriately set according to the thickness of the film.

From the viewpoints of laser processing suitability and interlayer adhesiveness, the average thickness of the mixed layer with respect to the thickness of the film is preferably 1.0% or more and more preferably 3.0% or more. The upper limit value of the average thickness of the mixed layer is not particularly limited, and is, for example, 95%.

<Layer C>

The film according to the embodiment of the present disclosure preferably further has a layer C, and more preferably has the layer B, the mixed layer, the layer A, and the layer C in this order from the viewpoint of adhesiveness to the metal layer.

The layer C is preferably an adhesive layer.

In addition, the layer C is preferably a surface layer (outermost layer).

From the viewpoint of the dielectric loss tangent of the film and the laser processing suitability, the layer C preferably contains a polymer.

The preferred aspect of the polymer used in the layer C is the same as the preferred aspect of the polymer having a dielectric loss tangent of 0.010 or less, which is used in the layer A, except as described below.

The polymer contained in the layer C may be the same as or different from the polymer contained in the layer A or in the layer B, but from the viewpoint of adhesiveness between the layer A and the layer C, it is preferable to be the same as the polymer contained in the layer A.

In addition, from the viewpoint of the dielectric loss tangent of the film and the laser processing suitability, the layer C preferably includes a polymer having an aromatic ring, and more preferably includes a polymer which is a resin having an aromatic ring and having an ester bond and an amide bond.

In addition, since the layer C is used to bond the metal layer and the layer A, it is preferable that the layer C contains an epoxy resin.

The epoxy resin is preferably a crosslinked product of a polyfunctional epoxy compound. The polyfunctional epoxy compound refers to a compound having two or more epoxy groups. The number of epoxy groups in the polyfunctional epoxy compound is preferably 2 to 4.

Examples of the polyfunctional epoxy compound include a polyfunctional epoxy compound having a glycidyl ether group, a polyfunctional epoxy compound having a glycidyl ester group, and a polyfunctional epoxy compound having a glycidylamino group. Examples of the polyfunctional epoxy compound having a glycidyl ether group include ethylene glycol diglycidyl ether, resorcinol diglycidyl ether, neopentyl glycol diglycidyl ether, 1,6-hexanediol diglycidyl ether, bisphenol A diglycidyl ether, trimethylolpropane polyglycidyl ether, polyglycerin polyglycidyl ether, glycerin polyglycidyl ether, pentaerythritol polyglycidyl ether, diglycerin polyglycidyl ether, sorbitol polyglycidyl ether, polybutadiene diglycidyl ether, diethylene glycol diglycidyl ether, polyethylene glycol diglycidyl ether, dipropylene glycol diglycidyl ether, and 1,4-butanediol diglycidyl ether.

Examples of the polyfunctional epoxy compound having a glycidyl ester group include diglycidyl phthalate ester, diglycidyl terephthalate ester, diglycidyl hexahydrophthalate ester, and diglycidyl dimerate.

Examples of the compound having a glycidylamino group include N,N,N',N'-tetraglycidyl-4,4'-diaminodiphenylmethane and 4,4'-methylenebis(N,N-diglycidylaniline).

Examples of the polyfunctional epoxy compound having a glycidyl ether group and a glycidylamino group include N,N-diglycidyl-4-glycidyloxyaniline.

Among these, from the viewpoint of the curing properties and an interaction with the metal surface, the epoxy resin is preferably a crosslinked substance of a polyfunctional epoxy compound having a glycidylamino group, and more preferably at least one crosslinked substance selected from the group consisting of N,N-diglycidyl-4-glycidyloxyaniline and N,N,N',N'-tetraglycidyl-4,4'-diaminodiphenylmethane.

In particular, from the viewpoints of the dielectric loss tangent of the film, the laser processing suitability, and the adhesiveness to the metal layer, it is preferable that the layer C contains aromatic polyester amide and an epoxy resin.

The layer C may contain a filler.

Preferred aspects of the filler which is used in the layer C are the same as the preferred aspects of the filler which is used in the layer B, except as described below.

A content of the filler in the layer C is not particularly limited and can be arbitrarily set. However, in a case where metal layers are provided on both surfaces of the film, from the viewpoint of adhesiveness to the metal layer, it is preferable that the content of the filler in the layer C is smaller than the content of the filler in the layer A.

The layer C may contain an additive other than those described above.

Preferred aspects of other additives which are used in the layer C are the same as the preferred aspects of other additives which are used in the layer A, except as described below. From the viewpoint of dielectric loss tangent of the film and adhesiveness to the metal, it is preferable that an average thickness of the layer C is smaller than an average thickness of the layer A.

From the viewpoint of dielectric loss tangent of the film and adhesiveness to the metal, a value of $T^A/T^C$, which is a ratio of the average thickness $T^A$ of the layer A to an average thickness $T^C$ of the layer C, is preferably more than 1, more preferably 2 to 100, still more preferably 2.5 to 20, and particularly preferably 3 to 10.

From the viewpoint of dielectric loss tangent of the film and adhesiveness to the metal, a value of $T^B/T^C$, which is a ratio of the average thickness $T^B$ of the layer B to the average thickness $T^C$ of the layer C, is preferably more than 1, more preferably 2 to 100, still more preferably 2.5 to 20, and particularly preferably 3 to 10.

Furthermore, from the viewpoint of dielectric loss tangent of the film and adhesiveness to the metal layer, the average thickness of the layer C is preferably 0.1 μm to 20 μm, more preferably 0.5 μm to 15 μm, still more preferably 1 μm to 10 μm, and particularly preferably 2 μm to 8 μm.

From the viewpoint of strength and electrical characteristics (characteristic impedance) in a case of being laminated with the metal layer, an average thickness of the film according to the embodiment of the present disclosure is preferably 6 μm to 200 μm, more preferably 12 μm to 100 μm, and particularly preferably 20 μm to 80 μm.

The average thickness of the film is measured at optional five sites using an adhesive film thickness meter, for example, an electronic micrometer (product name, "KG3001A", manufactured by Anritsu Corporation), and the average value of the measured values is defined as the average thickness of the film.

<Manufacturing Method of Film>

[Film Formation]

A manufacturing method of the film according to the embodiment of the present disclosure is not particularly limited, and a known method can be referred to.

Suitable examples of the manufacturing method of the film according to the present disclosure include a co-casting method, a sequential casting method, a multilayer coating method, a sequential coating method, and a co-extrusion method, and suitable examples of a combination thereof include a combination of a co-extrusion method and a coating method. Among these, the co-casting method or the multilayer coating method is particularly preferable for forming a relatively thin film, and the co-extrusion method is particularly preferable for forming a thick film.

In a case where the film is manufactured by the co-casting method or the multilayer coating method, it is preferable that the co-casting method or the multilayer coating method is performed by using a composition for forming the layer A, a composition for forming the layer B, a composition for forming the layer C, or the like obtained by dissolving or dispersing components of each layer in a solvent. A method of forming the mixed layer will be described later.

Examples of the solvent include halogenated hydrocarbons such as dichloromethane, chloroform, 1,1-dichloroethane, 1,2-dichloroethane, 1,1,2,2-tetrachloroethane, 1-chlorobutane, chlorobenzene, and o-dichlorobenzene; halogenated phenols such as p-chlorophenol, pentachlorophenol, and pentafluorophenol; ethers such as diethyl ether, tetrahydrofuran, and 1,4-dioxane; ketones such as acetone and cyclohexanone; esters such as ethyl acetate and y-butyrolactone; carbonates such as ethylene carbonate and propylene carbonate; amines such as triethylamine; nitrogen-containing heterocyclic aromatic compounds such as pyridine; nitriles such as acetonitrile and succinonitrile; amides such as N,N-dimethylformamide, N,N-dimethylacetamide, and N-methylpyrrolidone; urea compounds such as tetramethylurca; nitro compounds such as nitromethane and nitrobenzene; sulfur compounds such as dimethyl sulfoxide and sulfolane; and phosphorus compounds such as hexamethylphosphoramide and tri-n-butyl phosphate. Among these, two or more kinds thereof may be used in combination.

The solvent preferably contains an aprotic compound (particularly, an aprotic compound having no halogen atom) for low corrosiveness and easiness to handle. A proportion of the aprotic compound to the whole solvent is preferably 50% by mass to 100% by mass, more preferably 70% by mass to 100% by mass, and particularly preferably 90% by mass to 100% by mass. In addition, from the viewpoint of easily dissolving the liquid crystal polymer, as the above-described aprotic compound, it is preferable to contain an amide such as N,N-dimethylformamide, N,N-dimethylacetamide, tetramethylurea, and N-methylpyrrolidone, or an ester such as γ-butyrolactone; and it is more preferable to contain N,N-dimethylformamide, N,N-dimethylacetamide, or N-methylpyrrolidone.

In addition, as the solvent, it is preferable to contain a compound having a dipole moment of 3 to 5, because the above-described polymer such as the liquid crystal polymer can be easily dissolved. A proportion of the compound having a dipole moment of 3 to 5 to the whole solvent is preferably 50% by mass to 100% by mass, more preferably 70% by mass to 100% by mass, and particularly preferably 90% by mass to 100% by mass.

It is preferable to use the compound having a dipole moment of 3 to 5 as the above-described aprotic compound.

In addition, as the solvent, it is preferable to contain a compound having a boiling point of 220° C. or lower at 1 atm, because the solvent is easily removed. A proportion of the compound having a boiling point of 220° C. or lower at 1 atm to the whole solvent is preferably 50% by mass to 100% by mass, more preferably 70% by mass to 100% by mass, and particularly preferably 90% by mass to 100% by mass.

It is preferable to use the compound having a boiling point of 220° C. or lower at 1 atm as the above-described aprotic compound.

In addition, in a case where the film is manufactured by a manufacturing method such as the co-casting method, the multilayer coating method, the co-extrusion method, or the like described above, a support may be used in the method of manufacturing the film according to the embodiment of the present disclosure. In addition, in a case where the metal layer (metal foil) or the like used in the laminate described later is used as the support, the support may be used as it is without being peeled off.

Examples of the support include a metal drum, a metal band, a glass plate, a resin film, and a metal foil. Among these, a metal drum, a metal band, or a resin film is preferable.

Examples of the resin film include a polyimide (PI) film, and examples of commercially available products thereof include U-PILEX S and U-PILEX R (manufactured by Ube Corporation), KAPTON (manufactured by Du Pont-Toray Co., Ltd.), and IF30, IF70, and LV300 (manufactured by SKC Kolon PI, Inc.).

In addition, the support may have a surface treatment layer formed on the surface so that the support can be easily peeled off. Hard chrome plating, a fluororesin, or the like can be used as the surface treatment layer.

An average thickness of the support is not particularly limited, but is preferably 25 μm or more and 75 μm or less and more preferably 50 μm or more and 75 μm or less.

In addition, a method for removing at least a part of the solvent from a cast or applied film-like composition (a casting film or a coating film) is not particularly limited, and a known drying method can be used.

[Stretching]

In the film according to the embodiment of the present disclosure, stretching can be combined as appropriate from the viewpoint of controlling molecular alignment and adjusting a linear expansion coefficient and mechanical properties. The stretching method is not particularly limited, and a known method can be referred to, and the stretching method may be carried out in a solvent-containing state or in a dry film state. The stretching in the solvent-containing state may be carried out by gripping and stretching the film, or may be carried out by utilizing self-contraction due to drying without stretching. The stretching is particularly effective for the purpose of improving the breaking elongation and the breaking strength, in a case where brittleness of the film is reduced by addition of an inorganic filler or the like.

In addition, the manufacturing method of the film according to the embodiment of the present disclosure may include a step of polymerizing the film by light or heat, as necessary.

A light irradiation unit and a heat application unit are not particularly limited, and a known light irradiation unit such as a metal halide lamp and a known heat application unit such as a heater can be used.

Light irradiation conditions and heat application conditions are not particularly limited, and the polymerization can be carried out at a desired temperature and time and in a known atmosphere.

[Heat Treatment]

The manufacturing method of the film according to the embodiment of the present disclosure preferably includes a step of subjecting the film to a heat treatment (annealing).

Specifically, from the viewpoint of dielectric loss tangent and peel strength, the heat treatment temperature in the above-described step of heat-treating is preferably 260° C. to 370° C., more preferably 280° C. to 360° C., and still more preferably 300° C. to 350° C. The heat treatment time is preferably 15 minutes to 10 hours and more preferably 30 minutes to 5 hours.

In addition, the manufacturing method of the film according to the embodiment of the present disclosure may include other known steps as necessary.

[Formation of Mixed Layer]

In the film of the embodiment of the present disclosure, the method of forming the mixed layer is not specifically limited, and examples of methods for forming the mixed layer include: laminating and drying the respective layers while the layers are in a fluid state containing a solvent; laminating and drying an additional layer in a state in which the layers include residual solvent; laminating and drying a composition that contains a solvent which causes a layer, which does not contain residual solvent, to swell or dissolve; and applying energy such as heat or sound waves after laminating each layer to mix the layers. In particular, a method using a solvent is preferable.

In addition, a method of adjusting the SP value of the material of each layer and the like and a method of adding a material common to each layer to promote mixing are also effective.

<Applications>

The film according to the embodiment of the present disclosure can be used for various applications. Among the various applications, the film can be used suitably as a film for an electronic component such as a printed wiring board and more suitably for a flexible printed circuit board.

In addition, the film according to the embodiment of the present disclosure can be suitably used as a metal adhesive film.

(Laminate)

The laminate according to the embodiment of the present disclosure may be a laminate in which the film according to the embodiment of the present disclosure is laminated, but is preferably a laminate having the film according to the embodiment of the present disclosure and a metal layer or a metal wire disposed on at least one surface of the film.

In addition, it is preferable that the laminate according to the embodiment of the present disclosure includes the film according to the embodiment of the present disclosure and a metal layer disposed on a surface of the above-described layer B side of the film, and it is more preferable that the metal layer is a copper layer.

The metal layer disposed on the surface of the above-described layer B side is preferably a metal layer disposed on the surface of the above-described layer B.

In addition, it is preferable that the laminate according to the embodiment of the present disclosure includes the film according to the embodiment of the present disclosure in which the layer B, the layer A, and the layer C are provided in this order in the thickness direction, a metal layer disposed on a surface of the above-described layer B side of the film, and a metal layer disposed on a surface of the above-described layer C side of the film; and it is more preferable that both of the metal layers are copper layers.

It is preferable that the metal layer disposed on the surface of the above-described layer C side is a metal layer disposed on the surface of the above-described layer C, and it is more preferable that the metal layer disposed on the surface of the above-described layer B side is a metal layer disposed on the surface of the above-described layer B, and the metal layer disposed on the surface of the above-described layer C side is a metal layer disposed on the surface of the above-described layer C.

In addition, the metal layer disposed on the surface of the above-described layer B side and the metal layer disposed on the surface of the above-described layer C side may be a metal layer having the same material, thickness, and shape, or may be metal layers having different materials, thicknesses, and shapes. From the viewpoint of adjusting the characteristic impedance, the metal layer disposed on the surface of the above-described layer B side and the metal layer disposed on the surface of the above-described layer C side may be metal layers having different materials or thicknesses, or a metal layer may be laminated on only one side of the layer B or the layer C.

Furthermore, from the viewpoint of adjusting the characteristic impedance, preferred examples thereof also include an aspect in which a metal layer is laminated on one side of the layer B or the layer C, and another film is laminated on the other side.

A method of attaching the film according to the embodiment of the present disclosure to the metal layer is not particularly limited, and a known laminating method can be used.

In a case where the above-described metal layer is the above-described copper layer, a peel strength between the above-described film and the above-described copper layer is preferably 0.5 kN/m or more, more preferably 0.7 kN/m or more, still more preferably 0.7 kN/m to 2.0 kN/m, and particularly preferably 0.9 kN/m to 1.5 kN/m.

In the present disclosure, the peeling strength between the film and the metal layer (for example, the copper layer) is measured by the following method.

A peeling test piece with a width of 1.0 cm is produced from the laminate of the film and the metal layer, the film is fixed to a flat plate with double-sided adhesive tape, and the strength (kN/m) in a case of peeling the film off from the metal layer at a rate of 50 mm/min is measured by the 180° method in conformity with JIS C 5016 (1994).

From the viewpoint of reducing transmission loss of high-frequency signal, a surface asperity Rz of the above-described metal layer on the side in contact with the above-described film is preferably less than 1 μm, more preferably 0.5 μm or less, and particularly preferably 0.3 μm or less.

Since it is preferable that the surface asperity Rz of the above-described metal layer is as small as possible, the lower limit value thereof is not particularly set, but may be, for example, 0 or more.

The "surface asperity Rz" in the present disclosure refers to a value expressed in micrometer, which is the total value of the maximum value of height of peak and the maximum value of depth of valley observed on a asperity curve over the reference length.

In the present disclosure, the surface asperity Rz of the metal layer (for example, the copper layer) is measured by the following method.

Using a noncontact surface/layer cross-sectional shape measurement system VertScan (manufactured by MITSUBISHI CHEMICAL SYSTEMS, Inc.), a square of 465.48 μm in length and 620.64 μm in width is measured to create a asperity curve on the surface of the measurement object (metal layer) and create an average line of the asperity curve. A portion corresponding to the reference length is extracted from the asperity curve. The surface asperity Rz of the measurement object is measured by obtaining the total value of the maximum value of height of peak (that is, height from the average line to summit) and the maximum value of depth of valley (that is, height from the average line to valley bottom) observed in the extracted asperity curve.

The metal layer is preferably a copper layer. As the copper layer, a rolled copper foil formed by a rolling method or an electrolytic copper foil formed by an electrolytic method is preferable.

An average thickness of the metal layer, preferably the copper layer, is not particularly limited, but is preferably 2 μm to 30 μm, more preferably 3 μm to 20 μm, and still more preferably 5 μm to 18 μm. The copper foil may be copper foil with a carrier formed on a support (carrier) so as to be peelable. As the carrier, a known carrier can be used. An average thickness of the carrier is not particularly limited, but is preferably 10 μm to 100 μm and more preferably 18 μm to 50 μm.

In addition, from the viewpoint of further exerting the effects of the present disclosure, the above-described metal layer preferably has a known surface treatment layer (for example, a chemical treatment layer) on the surface of the side in contact with the film to ensure adhesion to the resin. In addition, it is preferable that the above-described interactable group is a group corresponding to the functional group of the compound having a functional group, which is contained in the above-described film, such as an amino group and an epoxy group, and a hydroxy group and an epoxy group.

Examples of the interactable group include a group mentioned as the functional group in the above-described compound having a functional group.

Among these, from the viewpoint of adhesiveness and ease of performing a treatment, a covalent-bondable group is preferable, an amino group or a hydroxy group is more preferable, and an amino group is particularly preferable.

The metal layer in the laminate according to the embodiment of the present disclosure may be a metal layer having a circuit pattern.

It is also preferable that the metal layer in the laminate according to the embodiment of the present disclosure is processed into, for example, a desired circuit pattern by etching to form a flexible printed circuit board. The etching method is not particularly limited, and a known etching method can be used.

EXAMPLES

Hereinafter, the present disclosure will be described in more detail with reference to Examples. The materials, the used amounts, the proportions, the treatment contents, the treatment procedures, and the like described in the following examples can be appropriately changed without departing from the gist of the present disclosure. Therefore, the scope of the present disclosure is not limited to the following specific examples.

In addition, in the present examples, unless otherwise specified, "%" and "part" mean "% by mass" and "part by mass" respectively.

<Polymer or Polymer Particles>

P1: Aromatic polyester amide (liquid crystal polymer) produced by the production method described below P2: Product name "TAFTEC M1913", manufactured by Asahi Kasei Corporation, a hydrogenated styrene-ethylene-butylene-styrene block copolymer PP-1: Liquid crystal polymer particles produced by production method described below PP-2: Product name "TAFTEC M1913", manufactured by Asahi Kasei Corporation, a hydrogenated styrene-ethylene-butylene-styrene block copolymer frozen and pulverized product (average particle diameter 5.0 μm (D50))

—Synthesis of Aromatic Polyester Amide P1—

940.9 g (5.0 mol) of 6-hydroxy-2-naphthoic acid, 415.3 g (2.5 mol) of isophthalic acid, 377.9 g (2.5 mol) of acetaminophen, 867.8 g (8.4 mol) of acetic anhydride are put in a reactor comprising a stirring device, a torque meter, a nitrogen gas introduction pipe, a thermometer, and a reflux condenser, gas in the reactor is substituted with nitrogen gas, a temperature increases from a room temperature (23° C., the same applies hereinafter) to 140° C. over 60 minutes while stirring under a nitrogen gas flow, and refluxing is performed at 140° C. for three hours.

Next, the temperature was raised from 150° C. to 300° C. over 5 hours while distilling off by-produced acetic acid and unreacted acetic acid anhydride, and maintained at 300° C. for 30 minutes. Thereafter, a content is taken out from the reactor and is cooled to the room temperature. The obtained solid was pulverized by a pulverizer to obtain a powdered aromatic polyester amide Ala. A flow start temperature of the aromatic polyester amide Ala was 193° C. In addition, the aromatic polyester amide Ala was a fully aromatic polyester amide.

The aromatic polyester amide Ala was subjected to solid polymerization by increasing the temperature from room temperature to 160° C. over 2 hours and 20 minutes in a nitrogen atmosphere, increasing the temperature from 160° C. to 180° C. over 3 hours and 20 minutes, and maintaining the temperature at 180° C. for 5 hours, and then the resultant was cooled. Next, the resultant was pulverized by a pulverizer to obtain a powdered aromatic polyester amide Alb. A flow start temperature of the aromatic polyester amide Alb was 220° C.

Aromatic polyester amide Alb is subjected to solid phase polymerization by increasing the temperature from the room temperature to 180° C. for one hour and 25 minutes, next increasing the temperature from 180° C. to 255° C. over six hours and 40 minutes, and maintaining the temperature at 255° C. for five hours in a nitrogen atmosphere, and then, is cooled, and powdered aromatic polyester amide PI is obtained.

A flow start temperature of the aromatic polyester amide PI was 302° C. A melting point of aromatic polyester amide PI is measured using a differential scanning calorimetry apparatus, and was 311° C. Solubility of aromatic polyester amide PI with respect to N-methylpyrrolidone at 140° C. is equal to or greater than 1% by mass.

—Preparation of Liquid Crystal Polymer Particles PP-1—

1034.99 g (5.5 mol) of 2-hydroxy-6-naphthoic acid, 89.18 g (0.41 mol) of 2,6-naphthalenedicarboxylic acid, 236.06 g (1.42 mol) of terephthalic acid, 341.39 g (1.83 mol) of 4,4-dihydroxybiphenyl, and potassium acetate and magnesium acetate as a catalyst were put in a reactor including a stirring device, a torque meter, a nitrogen gas introduction pipe, a thermometer, and a reflux condenser. The gas in the reactor was replaced with nitrogen gas, and acetic anhydride (1.08 molar equivalent with respect to a hydroxyl group) was further added thereto. The temperature was raised from room temperature to 150° C. over 15 minutes while stirring in a nitrogen gas stream, and refluxing was performed at 150° C. for 2 hours.

Next, the temperature was raised from 150° C. to 310° C. over 5 hours while distilling off by-produced acetic acid and unreacted acetic acid anhydride, and a polymerized substance was cooled to room temperature. An obtained polymerized substance increases in temperature from the room temperature to 295° C. over 14 hours, and is subjected to solid phase polymerization at 295° C. for one hour. After the solid phase polymerization, the temperature was lowered to room temperature over 5 hours, thereby obtaining liquid crystal polymer particles PP-1. The liquid crystal polymer particles PP-1 has a median diameter (D50) of 7 μm, a dielectric loss tangent of 0.0007, and a melting point of 334° C.

Example 1

—Preparation of Composition for Forming Layer C—

8 parts of aromatic polyester amide PI was added to 92 parts of N-methylpyrrolidone, and the mixture was stirred at 140° C. for 4 hours in a nitrogen atmosphere to obtain an aromatic polyester amide solution (concentration of solid contents: 8% by mass).

An aminophenol type epoxy resin ("jER630" manufactured by Mitsubishi Chemical Corporation, 0.04 parts by mass) was mixed with an aromatic polyester amide solution (10.0 parts by mass) to prepare a composition for forming a layer C.

—Preparation of Composition for Forming Layer A—

The polymer PI and the polymer PP-1 were mixed at a mass ratio of 30:70, and N-methylpyrrolidone was added to adjust the concentration of solid contents to be 22% by mass, thereby obtaining a composition A1 for forming a layer A.

—Preparation of Composition for Forming Layer B—

N-Methylpyrrolidone was added to PP-2 such that the concentration of solid contents was adjusted to 20% by mass to obtain a composition B1 for forming a layer B.

—Preparation of Single-Sided Copper-Clad Laminated Plate—

The obtained composition for forming a layer C, the composition A1 for forming a layer A, and the composition B1 for forming a layer B were fed to a slot die coater equipped with a slide coater, and the flow rate was adjusted such that the film thicknesses shown in Table 1 were obtained and the compositions were applied in a 3-layer structure (layer C/layer A/layer B) onto a surface of a copper foil (manufactured by Fukuda Metal Foil & Powder Co., Ltd., CF-T4X-SV-18, thickness: 18 μm, surface asperity Rz of a pasting surface (treated surface): 0.85 μm). In this case, the layer C was disposed on the copper foil side. The flow rate of each composition was adjusted such that the thickness of the layer C was 4 μm and the thicknesses of the layer A and the layer B were the values shown in Table 1. The coating film was dried with dried air having a vapor concentration of 8 vol % of N-methylpyrrolidone at 40° C. for 4 hours to remove the solvent and form a mixed layer, and then subjected to a heat treatment of heating from room temperature to 300° C. at 1° C./min and holding at that temperature for 2 hours in a nitrogen atmosphere, thereby obtaining a film (a single-sided copper-clad laminated plate) having a copper layer.

Example 2

The same test as that of Example 1 was carried out, except that in Example 1, the drying temperature was changed from 40° C. to 70° C.

Example 3

A film (single-sided copper-clad laminated plate) having a copper layer was obtained by the same method as in Example 1, except that the step of producing the single-sided copper-clad laminated plate in Example 1 was changed to a step shown below.

—Preparation of Single-Sided Copper-Clad Laminated Plate—

The obtained composition for forming a layer C, the composition A1 for forming a layer A, and the composition B1 for forming a layer B were fed to a slot die coater equipped with a feed block, interlayer mixing was performed during the feeding, and then the surface of a copper foil (manufactured by Fukuda Metal Foil & Powder Co., Ltd., CF-T4X-SV-18, thickness: 18 μm, surface asperity Rz of the pasting surface (treated surface): 0.85 μm) was coated in a 3-layer structure (layer C/layer A/layer B) by adjusting the flow rate to have a film thickness shown in Table 1. In this case, the layer C was disposed on the copper foil side. The flow rate of each composition was adjusted such that the thickness of the layer C was 4 μm and the thicknesses of the layer A and the layer B were the values shown in Table 1. The solvent was removed from the coating film by drying at 40° C. for 4 hours to form a mixed layer, and a heat treatment was further performed by heating from room temperature to 300° C. at 1° C./min and holding at that temperature for 2 hours in a nitrogen atmosphere to obtain a film having a copper layer (a single-sided copper-clad laminated plate).

Comparative Example 1

A film (single-sided copper-clad laminated plate) having a copper layer was obtained by the same method as in Example 1, except that the step of producing the single-sided copper-clad laminated plate in Example 1 was changed to a step shown below.

—Preparation of Single-Sided Copper-Clad Laminated Plate—

The obtained composition for forming a layer C was applied onto a surface of a copper foil (manufactured by Fukuda Metal Foil & Powder Co., Ltd., CF-T4X-SV-18, thickness: 18 μm, surface asperity Rz of the pasting surface (treated surface): 0.85 μm), and dried at 150° C. for 1 hour. Next, the obtained composition A1 for forming a layer A was applied and dried at 40° C. for 4 hours. Subsequently, the obtained composition B1 for forming a layer B was applied and dried at 40° C. for 4 hours. The obtained laminate having a 3-layer structure (layer C/layer A/layer B) was further subjected to a heat treatment of heating from room temperature to 300° C. at 1° C./min and holding at that temperature for 2 hours in a nitrogen atmosphere, thereby obtaining a film having a copper layer (a single-sided copper-clad laminated plate).

Comparative Example 2

A film (single-sided copper-clad laminated plate) having a copper layer was obtained by the same method as in Example 1, except that the step of producing the single-sided copper-clad laminated plate in Example 1 was changed to a step shown below.

—Preparation of Composition for Forming Layer A—

The polymer PI and the polymer PP-1 were mixed at a mass ratio of 30:70, N-methylpyrrolidone was added thereto to adjust the concentration of solid contents to be 25% by mass, and a composition A2 for forming a layer A was obtained.

—Preparation of Composition for Forming Layer B—

N-Methylpyrrolidone was added to the polymer P2 such that the concentration of solid contents was 20% by mass, and adjusted to obtain a composition B2 for forming a layer B.

—Preparation of Single-Sided Copper-Clad Laminated Plate—

The obtained composition for forming a layer C, the composition A2 for forming a layer A, and the composition B2 for forming a layer B were fed to a slot die coater equipped with a slide coater, and the flow rate was adjusted such that the thicknesses of the films were as shown in Table 1 and the copper foil (manufactured by Fukuda Metal Foil & Powder Co., Ltd., CF-T4X-SV-18, thickness: 18 μm, surface asperity Rz of the pasting surface (treated surface): 0.85 μm) was coated in a two-layer structure (layer A/layer B). In this case, the layer A was disposed on the copper foil side. The coating film was dried at 40° C. for 4 hours to remove the solvent from the coating film. Thereafter, the temperature was raised from room temperature to 300° C. at 1° C./min under a nitrogen atmosphere, and a heat treatment was performed at the temperature for 2 hours to obtain a film (single-sided copper-clad laminated plate) having a copper layer.

For the prepared film, the dielectric loss tangent, the elastic modulus of the layer A and the layer B at 160° C., and the weight residual rates $L^A$ and $L^B$ of the layer A and the layer B were measured. In addition, the laser processing suitability and the step followability were evaluated. The measurement results and the evaluation results are listed in Table 1.

In Table 1, "40% position" means a position of 40% with respect to the thickness of the film from the surface on the layer B side toward the thickness direction. The composition at this 40% position was represented by the mass ratio of the composition A and the composition B. The "60% position" means a position of 60% with respect to the thickness of the film from the surface on the layer B side toward the thickness direction. The composition at this 60% position was represented by the mass ratio of the composition A and the composition B.

In Comparative Example 1 and Comparative Example 2, since the mixed layer was not present, "-" was described in the column of the mixed layer.

[Dielectric Loss Tangent]

The dielectric loss tangent was measured by a resonance perturbation method at a frequency of 10 GHz. A 10 GHz cavity resonator (CP531 manufactured by KANTO Electronic Application and Development Inc.) is connected to a network analyzer ("E8363B" manufactured by Agilent Technology Co., Ltd.), the test piece is inserted into the cavity resonator, and the dielectric loss tangent of the film is measured from change in resonance frequency before and after insertion for 96 hours under an environment of a temperature of 25° C. and humidity of 60% RH.

[Elastic Modulus at 160° C.]

First, the film was cut in cross section with a microtome or the like, and the layer A or the layer B was specified with an optical microscope. Next, the elastic modulus of the specified layer A or layer B was measured as an indentation elastic modulus using a nanoindentation method. The indentation elastic modulus was measured by using a microhardness tester (product name "DUH-W201", manufactured by Shimadzu Corporation) to apply a load at a loading rate of 0.28 mN/sec with a Vickers indenter at 160° C., holding a maximum load of 10 mN for 10 seconds, and then unloading at a loading rate of 0.28 mN/sec.

[Weight Residual Rate]

The layer A or the layer B was cut from the film, 5 mg thereof was added to a platinum pan, and the measurement was performed at a temperature rising rate of 10° C./min and a measurement temperature of 25° C. to 900° C. using a differential thermal balance (TG-DTA) (TG-8120 manufactured by Rigaku Corporation). The weight residual rate ($L^A$ or $L^B$) was as follows.

$$\text{Weight residual rate}\left(\%, L^A \text{ or } L^B\right) = \text{weight residual rate (\%) at } 440^\circ C. - \text{weight residual rate (\%) at } 900^\circ C.$$

[Laser Processing Suitability]

(1) Production of Sample

The treated surface of a copper foil (product name "CF-T9DA-SV-18", average thickness of 18 μm, manufactured by Fukuda Metal Foil & Powder Co., Ltd.) was superimposed on the B-layer surface side of the prepared single-sided copper-clad laminated plate. A double-sided copper-clad laminated plate was obtained by performing a laminating treatment for 60 minutes under conditions of 160° C. and a laminating pressure of 4 MPa using a laminator (product name "Vacuum Laminator V-130", manufactured by Nikko-Materials Co., Ltd.).

(2) Measuring Method

Through-hole via holes were processed from the single-sided copper-clad laminated plate side of the double-sided copper-clad laminated plate using a UV-YAG laser Model 5330 manufactured by ESI. The cross section of the via portion was observed with an optical microscope, and the length of peeling of the layer A and the layer B (that is, the maximum length of the recess formed in the cut surface of the cut portion in a horizontal direction) was measured. In Table 1, the unit is "μm". It can be said that the shorter the length of peeling of the layer A and the layer B, the more excellent the laser processing suitability.

[Level Difference Followability (Wire Followability)]

(1) Production of Sample

—Production of Substrate with Wiring Pattern—

A copper foil (product name "CF-T9DA-SV-18", average thickness: 18 μm, manufactured by Fukuda Metal Foil & Powder Co., Ltd.) and a liquid crystal polymer film (product name "CTQ-50", average thickness: 50 μm, manufactured by Kuraray Co., Ltd.) as a substrate were produced. The copper foil, the substrate, and the copper foil were laminated in this order such that the treated surface of the copper foil was in contact with the substrate. A double-sided copper-clad laminated plate precursor was obtained by performing a laminating treatment for 1 minute under conditions of 140° C. and a laminating pressure of 0.4 MPa using a laminator (product name "Vacuum Laminator V-130", manufactured by Nikko-Materials Co., Ltd.). Subsequently, using a thermal compression machine (product name "MP-SNL", manufactured by toyo Seiki Seisaku-sho, Ltd.), the obtained double-sided copper-clad laminated plate precursor was thermal compression-bonded under conditions of 300° C. and a pressure of 4.5 MPa for 10 minutes to prepare a double-sided copper-clad laminated plate.

Each of the copper foils on both surfaces of the above-described double-sided copper-clad laminated plate was etched to perform patterning, and a substrate with wiring patterns including a ground line and three pairs of signal lines on both sides of the substrate was produced. A length of the signal line was 50 mm, and a width of the signal line was set such that characteristic impedance was 50Ω.

—Production of Wiring Board—

The substrate with wiring patterns produced above was overlaid on the layer B side of the produced single-sided copper-clad laminated plate, and a hot press was performed for 1 hour under the conditions of 160° C. and 4 MPa to obtain a wiring board.

In the obtained wiring board, the wiring patterns (the ground line and the signal line) were embedded, and the thickness of the wiring patterns was 18 μm.

(2) Measuring Method

The wiring board was cut along the thickness direction with a microtome, and a cross section was observed with an optical microscope. A length L of a gap generated between the resin layer and the wiring pattern in an in-plane direction was measured. The average value of the results at 10 points was calculated. The evaluation standards are as follows.

A: L is less than 2 μm.

B: L is 2 μm or more.

| | Layer B | | | | Mixed layer | | | |
|---|---|---|---|---|---|---|---|---|
| | Composition B | Weight residual rate [%] | Elastic modules at 160° C. [MPa] | Thickness [μm] | 40% position Composition B/ Composition A | 60% position Composition B/ Composition A | Thickness [μm] | Layer A Composition A |
| Example 1 | B1 | 12 | 1.7 | 23 | 95/5 | 5/95 | 7 | A1 |
| Example 2 | B1 | 12 | 1.7 | 23 | 85/15 | 15/85 | 23 | A1 |
| Example 3 | B1 | 34 | 2.1 | 23 | 70/30 | 30/70 | 46 | A1 |
| Comparative Example 1 | B1 | 12 | 1.7 | 23 | — | — | — | A1 |
| Comparative Example 2 | B2 | 12 | 1.7 | 25 | — | — | — | A2 |

| | Layer A | | | Film | | Evaluation result | |
|---|---|---|---|---|---|---|---|
| | Weight residual rate [%] | Elastic modulus at 160° C. [MPa] | Thickness [μm] | Thickness [μm] | Dielectric loss tangent | Laser processing suitability | Step follow-ability |
| Example 1 | 93 | 770 | 23 | 50 | 0.002 | 7 | A |
| Example 2 | 93 | 770 | 23 | 50 | 0.002 | 5 | A |
| Example 3 | 93 | 770 | 23 | 50 | 0.002 | 4 | B |
| Comparative Example 1 | 93 | 770 | 23 | 50 | 0.002 | 20 | A |
| Comparative Example 2 | 93 | 770 | 23 | 50 | 0.002 | 15 | A |

As shown in Table 1, it was found that in Examples 1 to 3, since as two imaginary planes perpendicular to a thickness direction, a plane A consisting of a composition A and a plane B consisting of a composition B are provided, a content of at least one component A included in the composition A is decreased from the plane A toward the plane B, a content of at least one component B included in the composition B is decreased from the plane B toward the plane A, and a dielectric loss tangent is 0.010 or less, the laser processing suitability is excellent.

On the other hand, in Comparative Examples 1 and 2, it was found that the laser processing suitability was inferior because the compositions of the layer A and the layer B were constant, the content of at least one component A included in the composition A did not decrease from the plane A toward the plane B, and the content of at least one component B included in the composition B did not decrease from the plane B toward the plane A.

The disclosure of Japanese Patent Application No. 2022-089034 filed on May 31, 2022 is incorporated in the present specification by reference. In addition, all documents, patent applications, and technical standards described in the present specification are incorporated herein by reference to the same extent as in a case of being specifically and individually noted that individual documents, patent applications, and technical standards are incorporated by reference.

What is claimed is:

1. A film, comprising, in the thickness direction:

a layer A consisting of a composition A and having a plane A;

a layer B consisting of a composition B and having a plane B; and a mixed layer that is located between the layer A and the layer B and contains components included in the composition A and the composition B, wherein a content of at least one component A contained in the composition A is decreased from the plane A toward the plane B, a content of at least one component B contained in the composition B is decreased from the plane B toward the plane A, and a dielectric loss tangent is 0.010 or less.

2. The film according to claim 1, wherein an average thickness of the mixed layer is 1.0% or more with respect to a thickness of the film.

3. The film according to claim 1, wherein an average thickness of at least one of the layer A or the layer B is 0.1 μm or more.

4. The film according to claim 1, wherein a value $L^A$ obtained by subtracting a weight residual rate of the layer A at 900° C. from a weight residual rate of the layer A at 440° C. is larger than a value $L^B$ obtained by subtracting a weight residual rate of the layer B at 900° C. from a weight residual rate of the layer B at 440° C.

5. The film according to claim 1, wherein a ratio of an elastic modulus of the layer A at 160° C. to an elastic modulus of the layer B at 160° C. is 1.2 or more.

6. The film according to claim 1, wherein an elastic modulus of the layer B at 160° C. is 100 MPa or less.

7. The film according to claim 1, wherein the layer B contains a thermoplastic resin containing a constitutional unit derived from a monomer having an aromatic hydrocarbon group.

8. The film according to claim 1, wherein the layer B contains a liquid crystal polymer.

9. The film according to claim 1, wherein the layer B contains an aromatic polyester amide.

10. The film according to claim 1, wherein the layer B contains crosslinked resin particles.

11. The film according to claim 1, wherein the layer A contains a liquid crystal polymer.

12. The film according to claim 1, wherein the layer A contains an aromatic polyester amide.

13. A laminate comprising:

the film according to claim 1; and a metal layer or a metal wire, disposed on at least one surface of the film.

14. The film according to claim 1, wherein the layer A contains liquid crystal polymer particles.

* * * * *